United States Patent [19]

Cancellieri et al.

[11] Patent Number: 5,789,705
[45] Date of Patent: Aug. 4, 1998

[54] ELECTRICAL/MECHANICAL TUBING CONNECTOR FOR SURFACE MOUNTED ELECTRICAL DEVICE BOX

[75] Inventors: Salvatore A. Cancellieri, Plainville, Conn.; John J. Chapdelaine, Eastlongmeadow, Mass.; Paul F. Nugent, Jr., New Britain; Wilfred R. Rogers, Bristol, both of Conn.

[73] Assignee: The Wiremold Company, West Hartford, Conn.

[21] Appl. No.: 722,604

[22] Filed: Sep. 27, 1996

[51] Int. Cl.[6] .................................................. H01R 13/46
[52] U.S. Cl. ............................ 174/59; 174/65 R; 248/56
[58] Field of Search ....................... 174/65 R, 59, 174/60, 95, 72 R; 248/56; 16/2.1, 2.2; 285/131, 137.1

[56] References Cited

U.S. PATENT DOCUMENTS 3,183,297  5/1965  Curtiss ........................ 174/65 R
5,068,496  11/1991 Favalora ...................... 174/65 R
5,204,499  4/1993  Favalora ...................... 174/65 R

*Primary Examiner*—Kristine L. Kincaid
*Assistant Examiner*—Dhiru R. Patel
*Attorney, Agent, or Firm*—McCormick, Paulding & Huber

[57] ABSTRACT

An electrical/mechanical tubing connector attached to a surface mounted electrical device box having a cover releasably secured to a mounting base includes a grooved inner end portion received within a notch in a wall of the cover and opposing recesses in the inner end portion receiving a tongue carried by the mounting base. Barbs on the tongue incise and grip the connector for improved retention and electrical continuity. An end of a length of mechanical/electrical tubing received within the outer end of the connector is secured to the connector by a set screw.

23 Claims, 3 Drawing Sheets

ELECTRICAL/MECHANICAL TUBING CONNECTOR FOR SURFACE MOUNTED ELECTRICAL DEVICE BOX

BACKGROUND OF THE INVENTION

This invention relates in general to electrical fixtures and deals more particularly with an improved electrical/mechanical tubing connector (EMT Connector) for use in a surface mounted electrical wiring system to connect electrical/mechanical tubing (EMT) to a surface mounted electrical device box, as, for example, an electrical switch and receptacle box.

EMT connectors of the afore-described general type heretofore available usually include a threaded end portion which passes through a cylindrical opening in an associated wall of a surface mounted electrical device box for connection to the box wall by a lock nut received on the threaded portion. This arrangement usually requires that a portion of the tubing adjacent the connected end of the tubing be offset outwardly away from the box supporting surface to provide clearance for the lock nut which secures the connector and attached tubing to the associated box wall. While the aforesaid arrangement generally provides satisfactory tubing retention and sufficient electrical continuity between the EMT and the electrical box to satisfy electrical code requirements, time consuming, labor intensive operations are necessary to form the required offset in the tubing and attach and secure the lock nut which retains the connector in assembly with the device box, all of which adds substantially to the cost of installing a surface mounted electrical wiring system. The present invention is concerned with these problems.

It is the general aim of the present invention to provide an improved EMT connector for attaching EMT to an associated electrical device box of the surface mounted type and which reduces the number of parts as well as the time and labor required to make an EMT/box connection while providing a box connection having retention and electrical continuity qualities at least equal to those of presently available EMT Connectors.

SUMMARY OF THE INVENTION

In accordance with the present invention an improved EMT connector is provided for use with a surface mounted electrical device box including a mounting base carrying a projecting tongue and a cover supported on the mounting base. The EMT connector has a body defining a bore extending axially through it and means for receiving and engaging the projecting tongue on the mounting base. A groove formed in the connector body cooperates with an associated portion of the cover to positively secure the connector to the device box when the box cover is positioned on and secured to the mounting base. A cylindrical portion of the bore which opens through an end of the connector body axially opposite the one end is sized to receive an associate end portion of an EMT.

DETAILED DESCRIPTION OF PREFERRED EMBODIMENT

Figure 1:
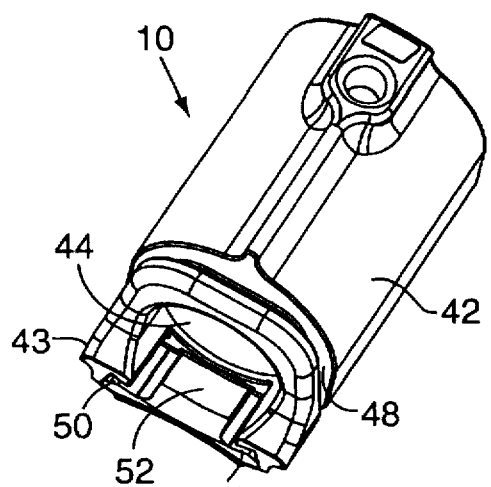
FIG. 1 is a perspective view of an EMT connector embodying the present invention.
Figure 2:
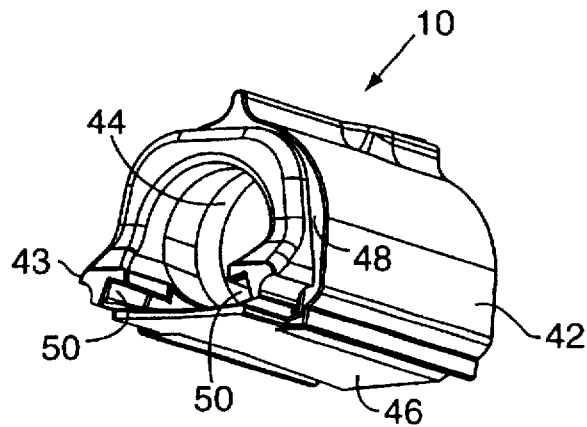
FIG. 2 is another perspective view of the EMT connector of FIG. 1 viewed from a different angle.
Figure 3:
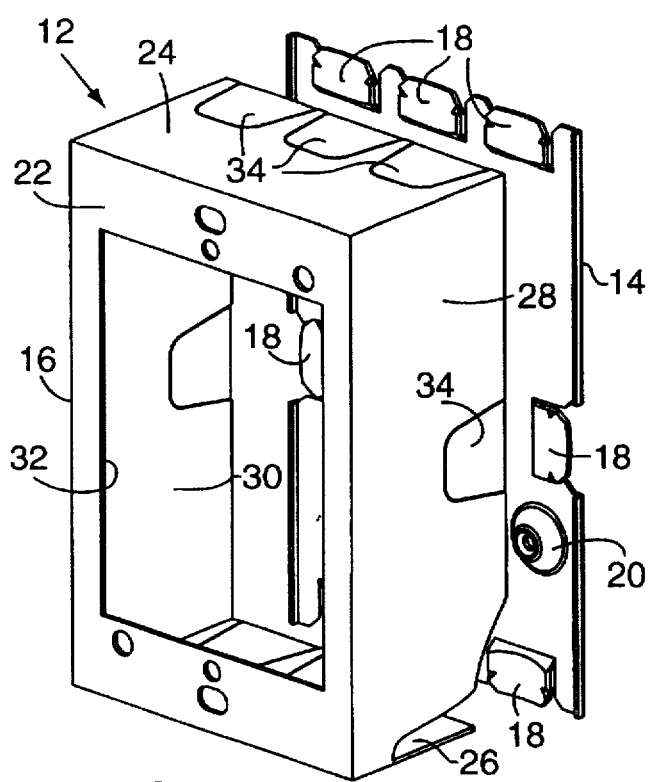
FIG. 3 is a somewhat reduced exploded perspective view of a typical electrical device box.
Figure 5:
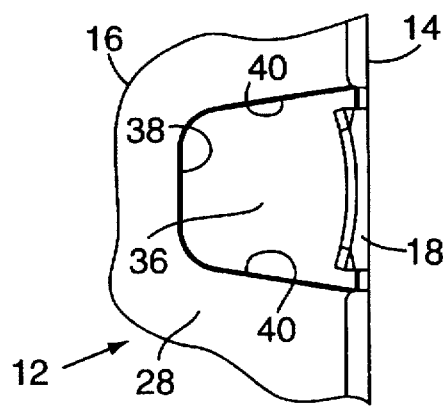
FIG. 5 is a somewhat enlarged fragmentary side elevational view of the device box of FIG. 3 shown with a break out portion of the box sidewall removed.
Figure 6:
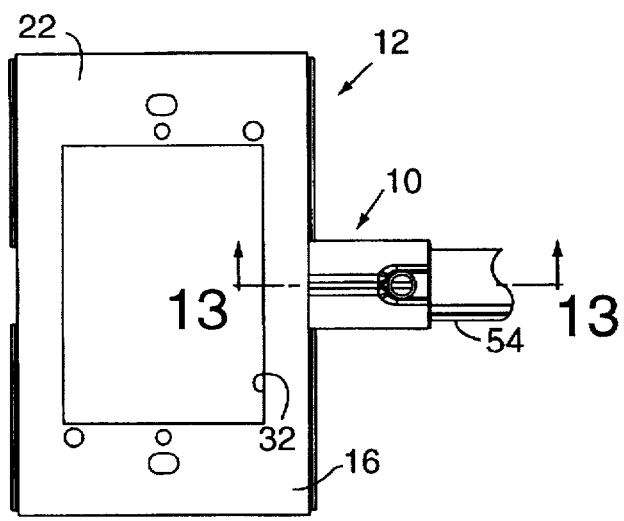
FIG. 6 is a fragmentary front elevational view of a device box shown with and EMT connector attached to one sidewall of the device box and an EMT attached to the connector.
Figure 7:
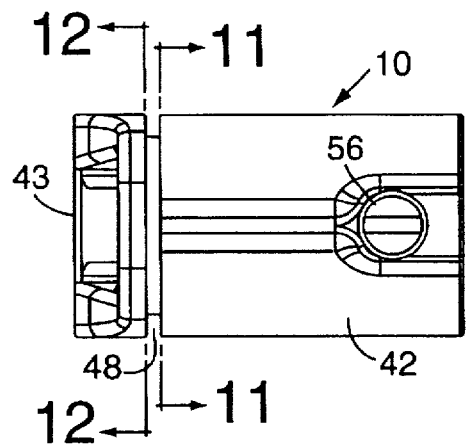
FIG. 7 is a front elevational view of the EMT connector shown in FIG. 6.
Figure 9:
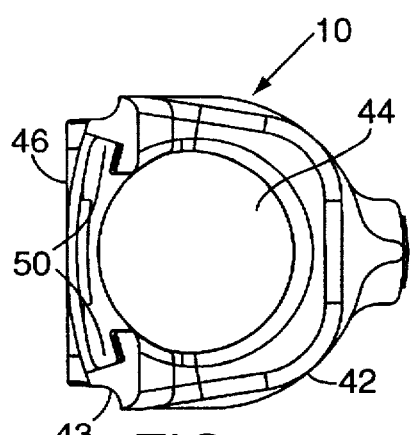
FIG. 9 is an inner end view of the EMT connector.
Figure 8:
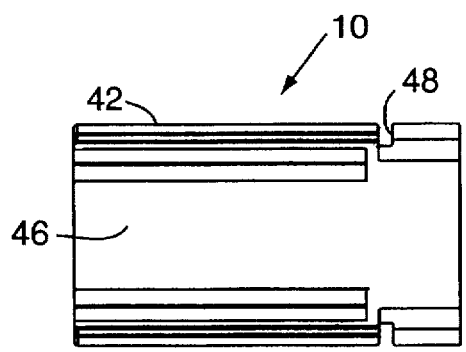
FIG. 8 is a rear elevational view of the EMT connector shown in FIG. 6.
Figure 10:
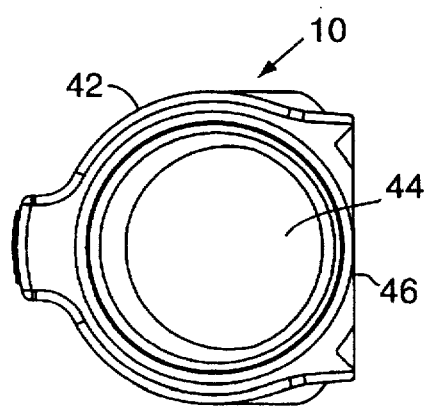
FIG. 10 is an outer end view of the EMT connector.
Figure 11:
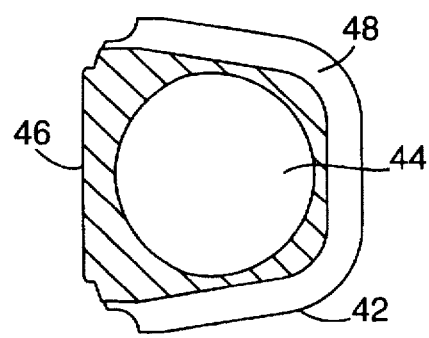
FIG. 11 is a sectional view taken along the line 11, 11 of FIG. 7.
Figure 12:
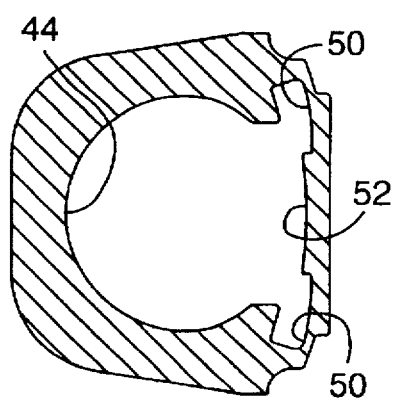
FIG. 12 is a somewhat enlarged sectional view taken along the line 12—12 of FIG. 7.

Turning now to the drawings an electrical/mechanical tubing connector (EMT connector) embodying the present invention is indicated generally by the reference numeral 10. The illustrated connecting member or connector 10 is particularly adapted for use in a surface mounted wiring system to for connect electrical/mechanical tubing (EMT) to an associated surface mounted electrical device box, as for example, an electrical switch and receptacle box. A typical electrical device box of the type with which the present invention is used, illustrated in FIGS. 3 and indicated generally by the reference numeral 12, comprises a V5748 switch and receptacle box produced by The Wiremold Company, West Hartford, Conn. 06110-2500, assignee of the present invention, and includes a mounting member or base 14 and a cover 16 for seating engagement on and releasable attachment to the mounting base. The mounting base 14 essentially comprises a generally rectangular formed metal plate defining a rearwardly facing mounting surface and having a plurality of integral tongues 18, 18 struck from it. The various tongues are forwardly offset relative to the frontal surface of the mounting plate and extend toward the peripheral edges of the plate, substantially as shown. Each tongue 18 has a substantially convexo-concave cross sectional configuration that is each tongue has a convex side which has a greater curvature than its concave side as best shown in FIG. 5. The mounting base 14 also has a plurality of apertured mounting bosses (one shown at 20) on its frontal surface for receiving fasteners used to secure the cover 16 to the mounting base.

The box cover 16 has a front wall 22, top and bottom walls 24 and 26 and sidewalls 28 and 30 of substantially uniform thickness. A generally rectangular opening 32 formed in the front wall receives one or more electrical fixtures, such as an electrical switch or an electrical outlet receptacle (not shown).

Figure 4:
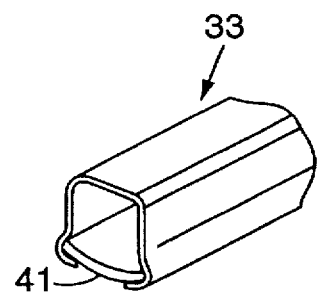
FIG. 4 is a fragmentary perspective view of a one-piece raceway.

The illustrated device box 12 is constructed and arranged for direct connection with a WIREMOLD V700 1-piece raceway, such as shown in FIG. 4 and indicated generally at 33, and for this reason break out or twist out panels 34, 34 are formed in the top, bottom and sidewalls for selective removal to facilitate direct connection of one or more such raceways such as shown in FIG. 5. Removal of a breakaway break out panel 34 from an associated wall of the device box 12 forms a rearwardly open notch in the box wall and exposes an associated tongue 18 aligned with the notch when the cover is secured in assembly with the mounting base 14.

A notch formed by removal of a break out portion, and indicated at 36 in FIG. 5, is generally U-shaped to generally compliment the cross sectional configuration of a V700 1-piece raceway 33. Specifically, the notch 36 has an end wall.38 and rearwardly and outwardly diverging side walls 40, 40. A raceway is connected to the box 12 by removing the box cover 16 and forcing an end portion of the raceway against an exposed tongue 18 associated with the notch to position the tongue within the open end of the raceway and below the rear or mounting wall of the raceway, the latter wall being indicated at 41 in FIG. 4. Thereafter, the cover 16 is secured on the mounting base 14 with the end portion of the raceway disposed within the notch in the cover wall. It will be apparent from the further description which follows that the EMT connector 10 is constructed and arranged for use with an electrical device box such as the aforedescribed WIREMOLD V5748 electrical switch an receptacle box without requiring modification of the box.

Considering now the EMT connector 10 in further detail and as it appears oriented in the drawings, the connector is made from a durable electrically conductive material, preferably metal, and has an axially elongated body 42 and a lip 43 which projects inwardly from the inner end of the rear of the body. A bore 44 extends axially through the body. The rear or support surface of the body, indicated at 46, is substantially planar for near engagement with a substantially flat surface of a wall or the like upon which the device box 12 may be mounted. A slot or groove 48 is formed around the body 42 forward of the rear surface 46 and opens through the rear surface. As shown, the groove 48 is spaced from the inner end of the body to receive an associated portion of the cover 16 when the EMT connector 10 is seated within an associated notch 36. The groove 48 is disposed in generally normal relation to the rear surface 46 and is generally configured to be received within and compliment the shape of an associated notch 36. The width dimension of the groove 48 is approximately equal to the thickness dimension of the cover walls.

A pair of laterally opposed recesses 50, 50 formed in the inner end of the body 42 open inwardly through the lip 43 and are configured to receive and generally compliment opposite side marginal portions of a tongue 18. Each open recess 50 is partially defined by a slightly rearwardly and inwardly inclined draft surface to aid in guiding an associated tongue 18 into the recesses when the connector 10 is assembled with an associated device box. A forwardly projecting pad or boss 52 formed on the lip 43 between the recesses 50, 50 and serves to apply pressure to the rearwardly bowed central portion of an arcuate tongue 18 when the tongue is positioned within the recesses 50, 50, thereby assuring a tight fit between the tongue and the connector body 42 to provide a high degree of electrical conductivity therebetween. A smooth radius of curvature is provided between all of the exposed intersecting surfaces at the inner end of the connector body 42 to eliminate risk of chaffing insulation on various conductors (not shown) which enter the device box 12 from an associate EMT and through the connector 10.

Figure 13:
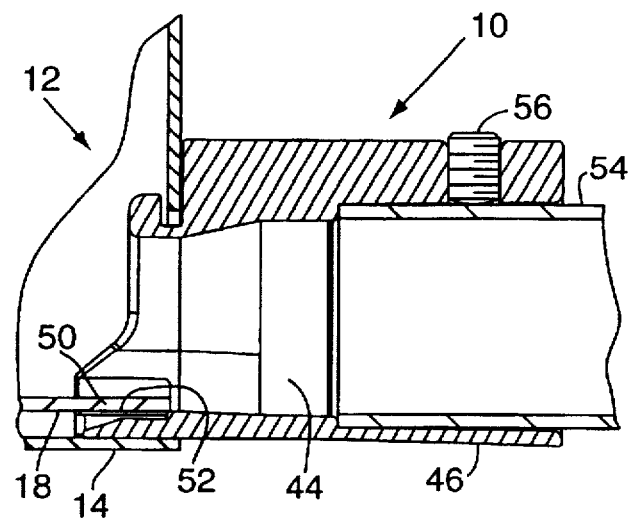
FIG. 13 is a somewhat enlarged sectional view taken along the line 13—13 of FIG. 6.

The outer end portion of the bore 44 is generally cylindrical and sized to receive an end portion of an EMT therein as best shown in FIG. 13 where the EMT is indicated at 54. The outer end portion of the bore 44 is somewhat larger than the inner end portion and disposed in near tangential relation to the rear surface 46. This arrangement makes it unnecessary to form an offset in the end portion of the EMT near its point of entry into the connector 10. A set screw 56 threadably engaged in the body is provided for securing EMT to the connector in a manner well known in the art.

The EMT connector 10 is attached to an electrical device box such as the device box 12 by first removing the cover 16 from the box. Thereafter an associated tongue 18 on the mounting base 14 is forcibly inserted into the recesses 50, 50. A break out portion is removed from an associated side wall of the cover 16 to provide an appropriate notch 36 in alignment with the tongue to which the EMT connector has been secured. Thereafter the cover 16 is positioned on and secured to the mounting base 14 with the notch seated within the slot or groove 48 whereby the connector 10 is positively secured in assembly with the device box 12. An inner end portion of an EMT 54 to be connected to the box 12 is inserted into the outer end of the connector bore 44 and secured therein by the set screw 56 as best shown in FIG. 13.

Figure 14:
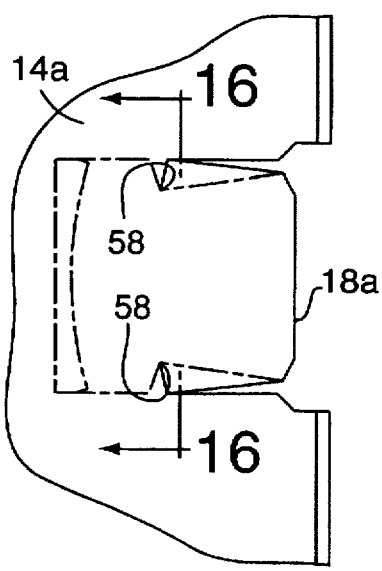
FIG. 14 is a somewhat enlarged fragmentary front elevational view of a modified mounting base for an electrical device box.
Figure 15:
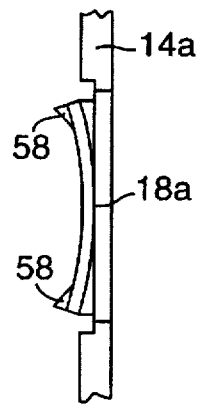
FIG. 15 is a fragmentary right side elevational view of the mounting base shown in FIG. 14.
Figure 16:
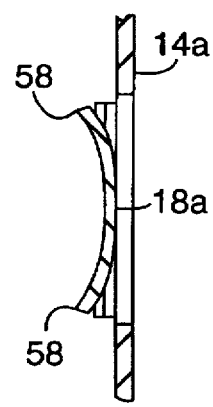
FIG. 16 is a sectional view taken along the line 16—16 of FIG. 14.

In accordance with a further embodiment of the invention an electrical device box, such as the device box 12 hereinbefore described but having a modified form of mounting base may be advantageously employed in practicing the present invention. Such a mounting base is illustrated in FIGS. 14–16 and indicated generally by the reference numeral 14a.

The mounting base 14a is similar in most respects to the mounting base 14, previously described, and essentially comprises a formed metal plate having a plurality of substantially identical integral tongues 18a (1 shown) struck from it. As in the previously described embodiment, the various tongues are forwardly offset relative to the frontal surface of the mounting base or plate. Each tongue 18a has at least one barb 58 struck from it. However, in the illustrated embodiment two opposing barbs 58, 58 are formed on each tongue. The barbs 58—58 are struck forwardly from each tongue when the mounting base is formed. The tongues are constructed and arranged to incise and grip the conductor body 42 within the recesses 50, 50 when the tongue is forcibly inserted into the recesses. The barbs improve connector retention and also assure that a high degree of electrical conductivity is established between the conductor and the associated mounting base to which it is connected. The mounting base 18a may also be used advantageously to secure a one-piece raceway 33 to an associated device box and such arrangement is contemplated within the scope of the present invention.

In the forgoing description and in the claims relative terms such as front, rear, top, bottom, inner and outer have been employed for convenience of description. However, it should be understood that the EMT connector of the present invention may be used in any orientation.

We claim:

1. A connector for attaching an electrical/mechanical tube to an electrical device box; said device box having a base plate including a rearwardly facing mounting surface, a forwardly facing supporting surface, and a tongue having a free outer end, said device box including a cover having a peripheral wall including a rearwardly facing seating surface, said cover having breakaway means associated with said peripheral wall for separation from said peripheral wall to define a connector receiving notch I said notch opening rearwardly through said seating surface, and means for securing said cover to said base plate with said tongue within said device box and extending outwardly toward said breakaway means, said connector having an axially elongated body including opposite inner and outer ends and defining a bore extending axially therethrough and opening through said opposite ends, said bore having a cylindrical portion opening through said outer end, and having a diameter sized to receive therein an associated end of an electrical/mechanical tube, said body having a slot therein spaced from said inner end for receiving an associated portion of said peripheral wall therein when said connector is attached to said device box within said notch, said connector body having means for receiving an associated portion of said tongue therein when said connector is attached to said device box within said notch.

2. A connector as set forth in claim 1 wherein said tongue is forwardly offset relative to said mounting surface and said connector body includes an integral lip projecting from said inner end of said body for at least partial disposal rearwardly of said tongue when said connector is attached to said device box within said notch.

3. A connector as set forth in claim 2 wherein said lip comprises said means for receiving said associated portion of said tongue.

4. A connector as set forth in claim 2 wherein said body defines a pair of laterally opposing recesses for receiving opposite side portions of said tongue therein when said connector is attached to said device box within said notch.

5. A connector as set forth in claim 4 wherein said tongue has a convexo concave cross sectional configuration including a rearwardly bowed portion and said lip has a forwardly projecting boss thereon for engaging said rearwardly bowed portion when said connector is attached to said device box within said notch.

6. A connector as set forth in claim 1 including securing means for releasably retaining an associated end portion of said electrical/mechanical tube within said cylindrical portion.

7. A connector as set forth in claim 6 wherein said securing means comprises a set screw threadably engaged with said connector body.

8. A connector as set forth in claim 1 wherein said connector body has a rear surface for disposal generally within the plane of said mounting surface when said connector is attached to said device box within said notch and said cylindrical portion is disposed in near tangential relation to said rear surface.

9. A combination comprising an electrical device box, and a connector attached to said device box for securing an electrical/mechanical tube to said device box, said device box having a base plate including a rearwardly facing mounting surface, a forwardly facing support surface, and a tongue having a free outer end, said device box including a cover having a peripheral wall including a rearwardly facing seating surface, said peripheral wall having a notch therein, said notch opening through said seating surface, said connector having an axially elongated body including axially opposite inner and outer ends and having a bore extending axially therethrough and opening through said opposite ends, said body having a slot therein spaced from said inner end, said connector being received within said notch and retained in assembly with said device box by an associated portion of said peripheral wall received within said slot, said body defining a recess receiving an associated portion of said tongue therein, and means on said device box for incising and gripping said connector when said connector is assembled with said device box within said notch.

10. The combination as set forth in claim 9 wherein said means for incising and gripping said connector comprises a barb on said tongue engaging said connector body within said recess.

11. A combination comprising an electrical device box, and a connector attached to said device box for securing an electrical/mechanical tube to said device box, said device box having a base member including a rearwardly facing mounting surface and a forwardly facing support surface, a cover having a peripheral wall including a rearwardly facing seating surface engaging said support surface, said wall having a notch therein said notch opening through said seating surface, said connector having a body member including axially opposite inner and outer ends and a bore extending axially therethrough and opening through said opposite ends, said body member having a slot therein spaced from said inner end and receiving an associated portion of said wall therein when said connector is assembled with said device box with said body member disposed within said notch, one of said base member and said body member having a tongue thereon, the other of said base member and said body member defining means for engaging said tongue when said connector is assembled with said device box within said notch.

12. The combination as set forth in claim 11 wherein said tongue is provided in said base member.

13. The combination as set forth in claim 11 wherein one of said body and base members includes means for incising and gripping the other of said body and base members when said connector is assembled with said device box within said notch.

14. The combination as set forth in claim 13 wherein said means for incising and gripping the other of said members comprises a barb on said one of said members.

15. The combination as set forth in claim 14 wherein said barb is formed from said tongue.

16. An electrical/mechanical tubing connector comprising an axially elongated body having opposite inner and outer ends and a bore extending axially therethrough and opening through said opposite ends, said bore having a cylindrical outer end portion sized to receive an associated end portion of an electrical/mechanical tube therein, said body having a rearwardly facing support surface and an inwardly projecting lip at said inner end partially defined by said rearwardly facing support surface, said body having a groove therein extending therearound and spaced outwardly from said inner end, said groove having opposite ends opening through said support surface.

17. The combination as set forth in claim 16 wherein said lip has a generally forwardly facing surface.

18. A connector as set forth in claim 17 wherein said lip has a pair of laterally opposing recesses formed therein at the opposite ends of said forwardly facing surface and opening through said lip at said inner end of said body.

19. A connector as set forth in claim 18 wherein said lip has a boss thereon projecting forwardly from said forwardly facing surface generally intermediate said recesses.

20. A connector for attaching an electrical/mechanical tube to a surface mounted electrical device box having a base plate including a rearwardly facing mounting surface and an outwardly projecting tongue, said connector having an axially elongated body including a rear surface for disposal generally within the plane of said mounting surface when said connector is attached to said device box and axially opposite inner and outer ends, said body having a bore extending axially therethrough and opening through said opposite ends, said bore having a cylindrical portion opening through said outer end and disposed in near tangential relation to said rear surface, said cylindrical portion being sized to receive an end portion of an associated electrical/mechanical tube therein, means on said inner end for cooperating with said device box to releasably secure said connector to said device box, and recess means in said inner end for receiving said tongue when said connector is secured to said device box.

21. An electrical/mechanical tubing connector comprising an axially elongated body having a generally axially parallel rear surface and axially opposite inner and outer ends, said body having a bore extending axially therethrough and opening through said opposite ends, said bore having a cylindrical portion opening through said outer end and disposed in near tangential relation to said rear surface, said body having a lip at said inner end partially defined by said rear surface and having a forwardly facing surface, said lip having a pair of laterally opposing recesses formed therein at opposite ends of and partially defined by said forwardly facing surface, said recesses opening through said inner end.

22. An electrical/mechanical tubing connector as set forth in claim 21 wherein said lip has a boss thereon projecting forwardly from said forwardly facing surface generally intermediate said recesses.

23. An electrical/mechanical tubing connector as set forth in claim 21 wherein said body is made from electrically conductive material.

\* \* \* \* \*